Nov. 26, 1929.  M. CASTRICUM  1,737,146
BIAS CUTTER
Filed March 12, 1928   4 Sheets-Sheet 1

INVENTOR.
MARTIN CASTRICUM.
BY
ATTORNEY.

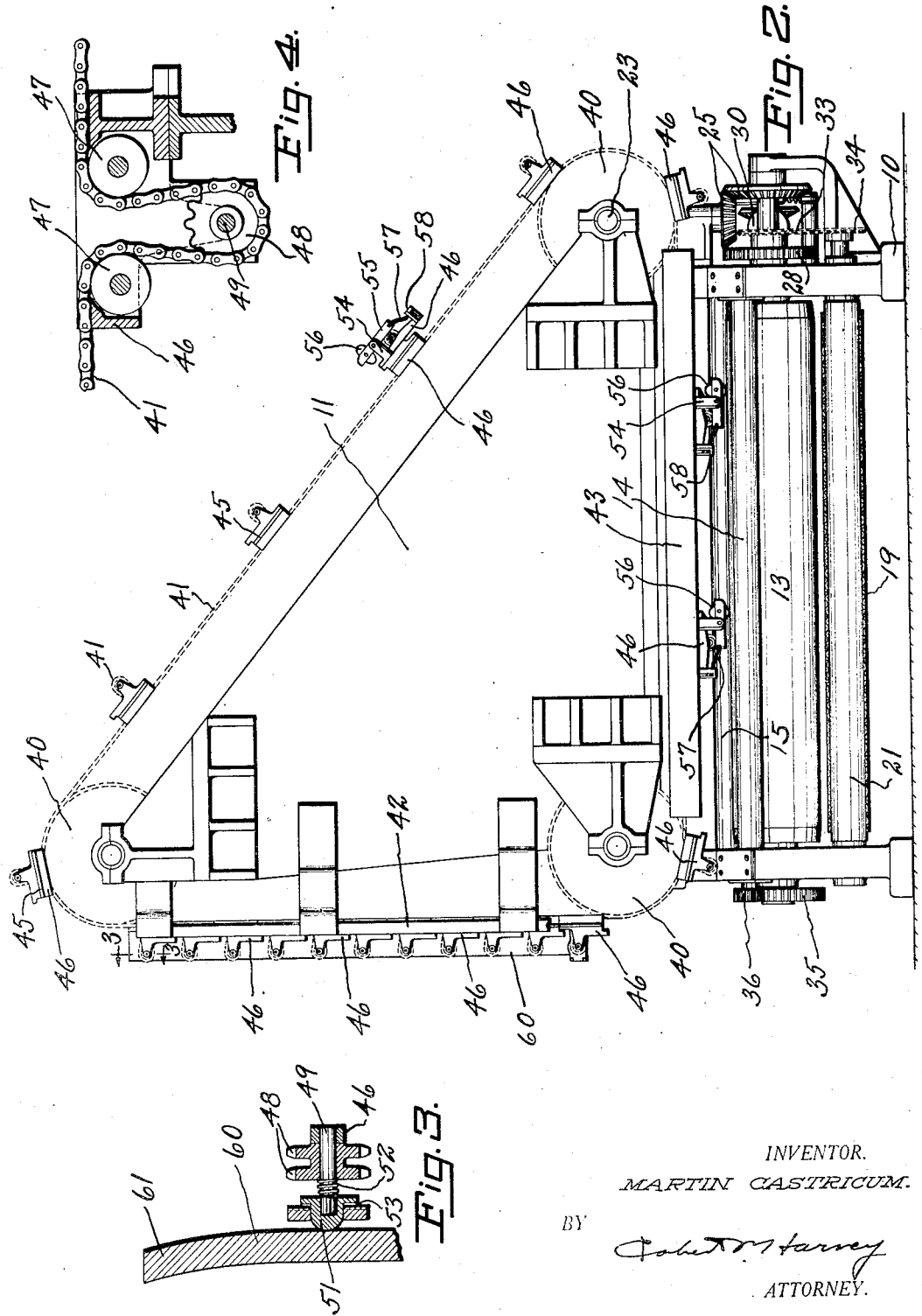

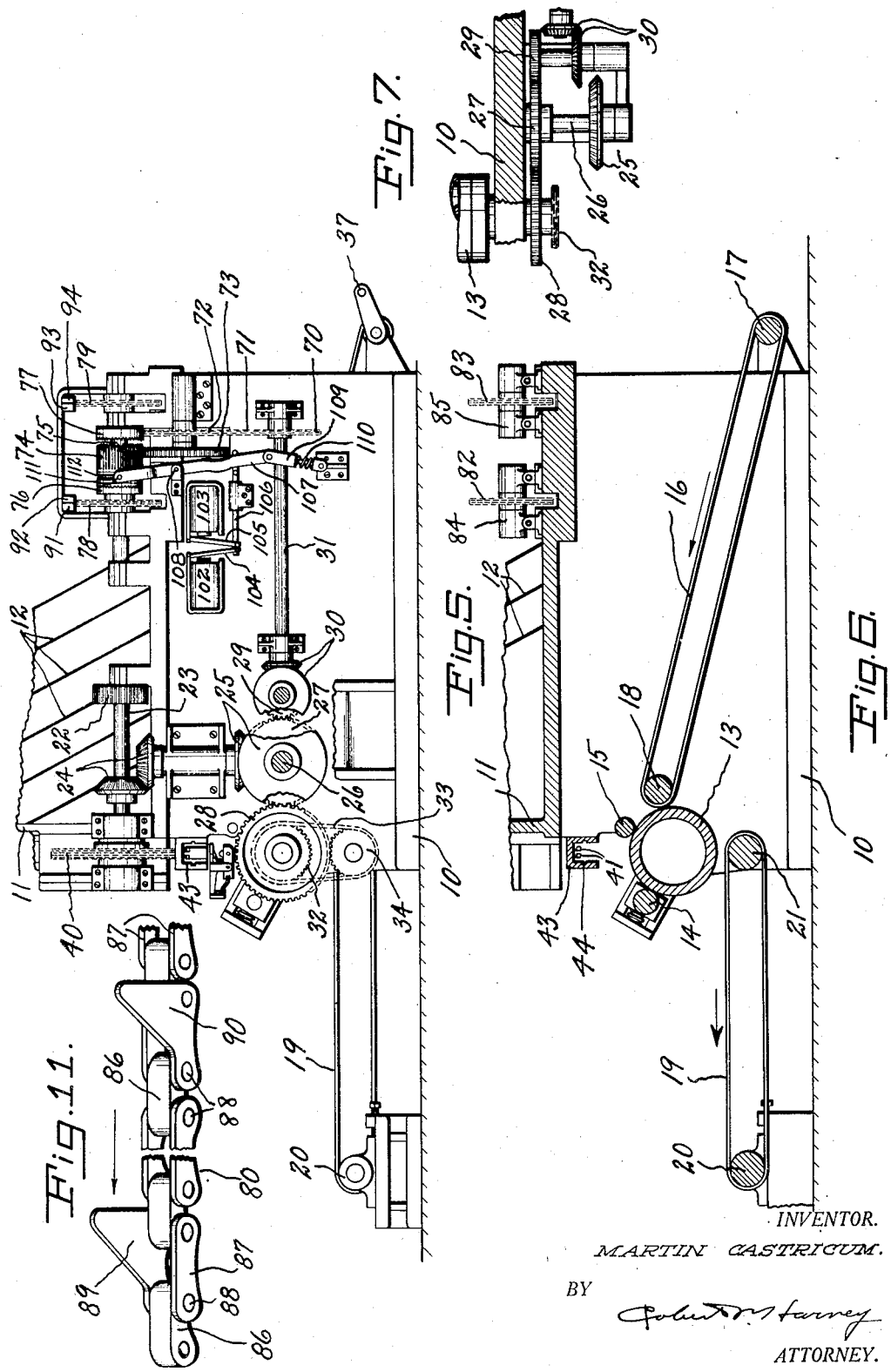

Nov. 26, 1929.	M. CASTRICUM	1,737,146
BIAS CUTTER
Filed March 12, 1928    4 Sheets-Sheet 4

INVENTOR.
MARTIN CASTRICUM.
BY
ATTORNEY.

Patented Nov. 26, 1929

1,737,146

UNITED STATES PATENT OFFICE

MARTIN CASTRICUM, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS

BIAS CUTTER

Application filed March 12, 1928. Serial No. 260,930.

This invention relates to machines for cutting fabric on the bias while the fabric is in motion. It has for one object the provision of a machine of this type which is readily adjustable from one width of cut to another. It has for a further object the elimination of any waste of time, or the making of any off-width cuts, during the change from one width of cut to another. It also has other and further objects as will appear from the specification and claims.

Referring to the drawings,

Fig. 2 is a front elevation thereof;

Fig. 3 is a section on line 3—3 of Fig. 2;

Fig. 4 is a section on line 4—4 of Fig. 8;

Fig. 5 is a partial side elevation thereof;

Fig. 6 is a section on line 6—6 of Fig. 1;

Fig. 7 is a plan section through certain driving mechanism shown in elevation in Fig. 5;

Fig. 11 is a detail of a timing chain.

Figure 1:
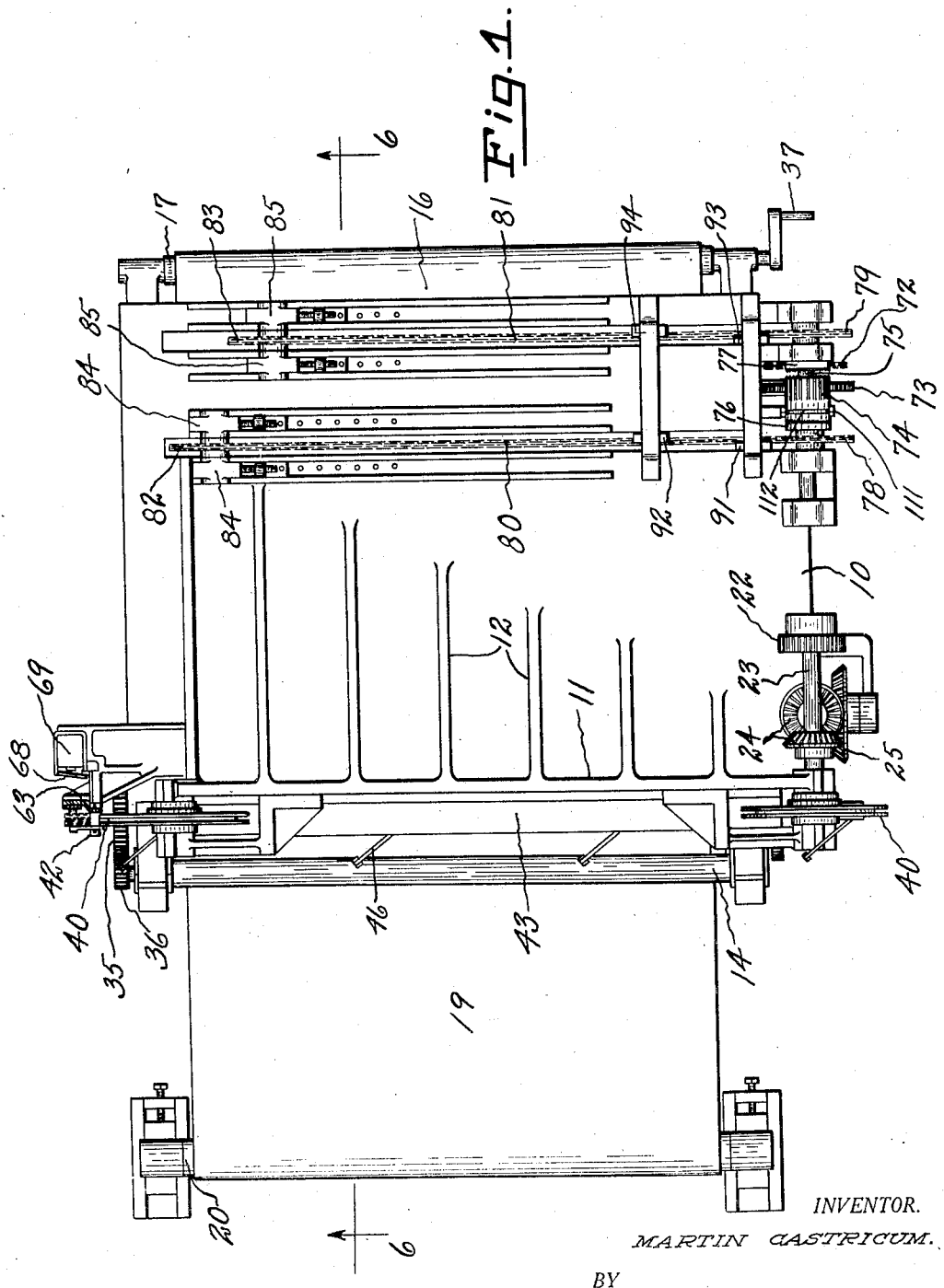
Fig. 1 is a top plan view of a machine embodying my invention.

The mechanism is supported on a frame 10 having a triangular upright portion 11 strengthened by ribs 12. The fabric while being cut is held upon the surface of a steel cylinder 13 by rolls 14 and 15. A conveyor 16, passing around pulleys 17 and 18, assists in feeding to the roll the leading end of fabric to be cut, which may be supplied on rolls or in other ways not necessary to show here. A conveyor 19, supported on pulleys 20 and 21, receives the cut material and carries it from the machine.

Power is supplied to the machine from any convenient source such as by a gear 22 mounted on a shaft 23, coupled as by bevel gearing 24 and 25 to a shaft 26. A gear 27 on this shaft meshes with a gear 28 on the shaft of cylinder 13 to drive the latter continuously at a predetermined speed definitely related to the speed of shaft 23. A gear 29 also meshes with gear 27, and through bevel gearing 30 rotates a shaft 31 from which certain timing mechanism is driven as will later appear. Conveyor 19 is driven by a sprocket 32 on the same shaft as gear 28, connected by a chain 33 to a sprocket 34 on the shaft of roll 21. Roll 14 is driven by gears 35 and 36 at the other end of the cylinder 13, and shown in Fig. 2. The conveyor 16 is used only in starting a new roll of material, and may conveniently be driven when wanted by a hand crank 37.

Journaled at the three corners of the triangular frame 11 are double sprockets 40, one of them keyed to shaft 23. Two closely spaced and parallel chains 41 are led around the sprockets, the double construction being used to give strength and stability in operation. A vertical guide 42 and a horizontal guide 43 are mounted upon the upright 11, and are each fitted with a slot 44 (Fig. 8) to receive ribs 45 on a series of cutter-carrying carriages 46. These carriages have parts extending from them at an angle, and for simplicity have not all been shown complete in Fig. 2. Two at the bottom and one on the slanting side of frame 11 have, however, been shown complete.

Figure 8:
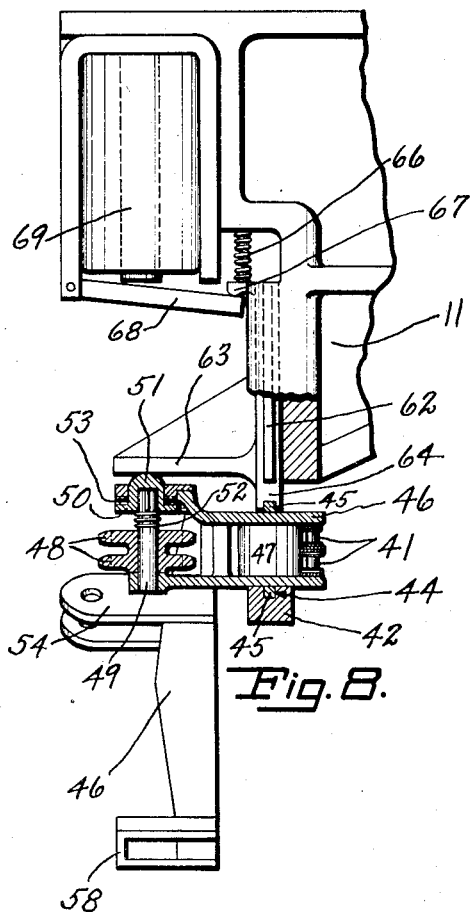
Fig. 8 is a plan of certain release mechanism, showing a cutter carriage in position, taken on line 8—8 of Fig. 9.

Each carriage has a pair of spaced idler rolls 47 around which the chains 41 pass freely, and a double sprocket 48 spaced from the rolls so that it always points outwardly as the carriage passes around the periphery of the triangular frame. The general arrangement of rolls and sprocket is best shown in Fig. 4. Sprocket 48 is fixed on a shaft 49 rotatably mounted in the carriage and having keyed to it a clutch sleeve 50 having a head 51 projecting through the carriage wall to one side thereof (Fig. 8). A spring 52 normally presses the clutch sleeve away from the sprocket, so that teeth 53 on the sprocket engage similar teeth on the wall of the carriage and prevent relative rotation of the sleeve, and hence the sprocket and the carriage are coupled to the chain for travel with it.

Figure 9:
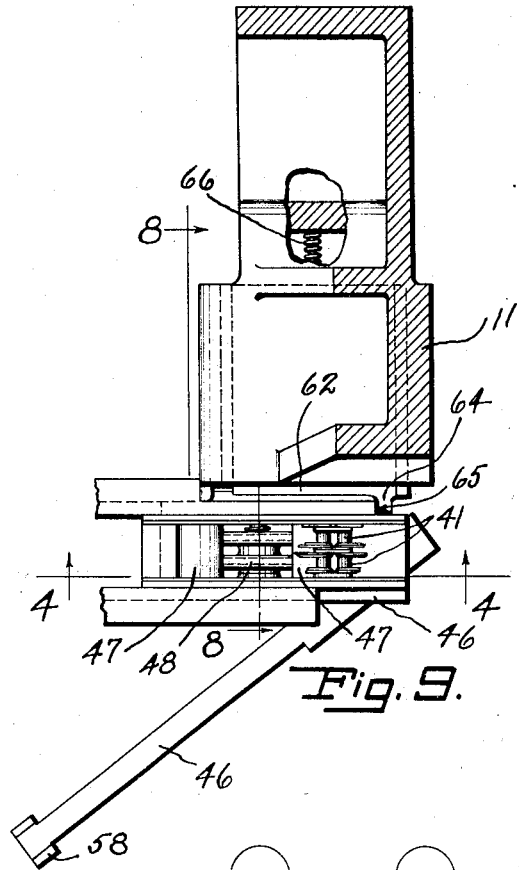
Fig. 9 is a side elevation of the parts shown in Fig. 8.

Each carriage also has a yoke 54 projecting outwardly and set at an angle, in which is pivotally mounted a cutter bar 55 (removed for clearness in Figs. 8 and 9 but appearing in Fig. 2) bearing a cutter wheel 56 at one end thereof. A spring 57 on the bar presses against a holder 58 on the carriage to give the cutter wheel a steady outward pressure when bearing on cylinder 13. The carriages are drawn in succession axially along cylinder 13 by the chains 41, and as cylinder 13 is rotating constantly during this movement the result will be that the cutters 56 will be drawn on bias lines across the fabric supported on the cylinder. The angular mounting of the cutter wheel is for the purpose of permitting the roll to make a smooth cut on this bias line. By changing the relative speeds of chains 41 and cylinder 13, and by changing the angles of the cutters on the carriages, the angle of bias cut can be regulated.

As the carriages start down the vertical side of the frame 11 their clutch heads 51 contact with a cam strip 60 having its upper end bent at 61 (Fig. 3) so as to press the clutch head into the carriage and disengage the clutch. At the bottom of the cam strip is a slide 62 (Fig. 8) having a cam portion 63 formed as a continuation of the cam 60. The slide bears also a stop 64 which contacts with the end of the guiding rib 45 on the adjacent side of the carriage, the ribs on that side being cut away as at 65 (Fig. 9) to permit the stop to enter between the ribs on successive carriages. A spring 66 presses the slide constantly outwardly, while retraction at desired times is provided for by a lip 67 engaged with by the pivoted armature 68 of an electromagnet 69. When energized by control mechanism to be described the magnet draws the slide back to release the lowermost carriage on the vertical side of the frame, the withdrawal of stop 64 freeing the carriage and the withdrawal of cam 63 releasing the clutch 50 so that the carriage is coupled to the chains for movement therewith.

The actuation of magnet 69 is by a timing device operated from the shaft 31 previously referred to. This shaft carries a sprocket 70 (Fig. 5) connected by a chain 71 with a sprocket 72 fixed to the shaft of a gear 73. A wide pinion 74, free on a shaft 75 and having clutch faces mating with clutch members 76 and 77, meshes constantly with gear 73 although slidable upon the shaft to engage one or the other of the clutch members. Clutch member 76 has a sprocket 78, and member 77 a sprocket 79, fixed to it, around which pass chains 80 and 81 (Fig. 1) respectively, passing at their other ends around sprockets 82 and 83 mounted in adjustable journal boxes 84 and 85. Chains 80 and 81 are preferably made as indicated in Fig. 11, being formed of blocks 86 joined to pairs of spaced links 87 by pintles 88. Each chain has one link 89 on one side and one link 90 on the other enlarged to form lugs coacting respectively with switches 91 and 92 in the path of chain 80 and with switches 93 and 94 in the path of the other chain 81 see Figs 1 and 11. These switches are of the ordinary commercial momentary contact type closing the circuit through them when actuated by the lugs. As shown in Fig. 1, the pairs of switches associated with each chain are staggered, so as to be actuated by one lug only, and are spaced apart the same distance as the spacing of the lugs on the chain.

Figure 10:
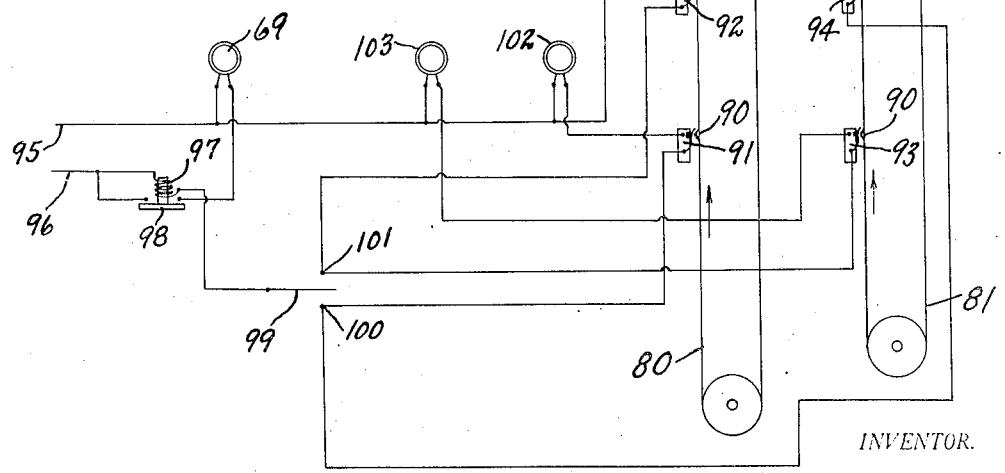
Fig. 10 is a wiring diagram.

Referring now to the wiring diagram of Fig. 10, the main electrical line 95, 95 has one branch 96 passing through the coil 97 of a contactor 98 to the lever of a two-way switch 99 having contacts 100 and 101. From contact 100 the circuit leads through switch 91 through the coil of a magnet 102 to the side 95 of the line; while from contact 101 the circuit leads through a similar magnet coil 103 by way of switch 93. One side of the magnet 69 is joined to one side 95 of the line, while the other passes to side 96 through the contactor 98 when this is closed. If switch 99 is placed on contact 100 the switch 94 is shunted around switch 91 and magnet 102, the circuit being closed every time the lug 89 on chain 81 passes it. The closure of the circuit actuates contactor 98 and sends a temporary impulse through magnet 69, releasing a cutter carriage at each impulse. If the switch 99 is placed on contact 101 a similar action occurs with the exception that switch 92 and chain 80 are the operating factors. Magnets 102 and 103 serve to shift the clutch pinion 74 upon each reversal of switch 99, and act through the following mechanism. The armatures 104 and 105 of these two magnets are connected to a rod 106 operating upon a lever 107 pivoted at 108 and adapted to be held in either extreme position by a toggle 109 and spring 110. The upper end of the lever is forked to embrace pinion 74, and pins 111 therein enter into a groove 112 in the pinion. In the position shown in Fig. 5, electrical impulses sent through magnet 103 will be without effect, as the pinion 74 is already at the end of its travel to which this magnet tends to shift it. Actuation of magnet 102, however, will move the pinion to the other end of its stroke and will cause rotation of sprocket 79 instead of sprocket 78.

The general operation of the machine will now be considered. Shaft 23 and parts geared thereto being rotated continuously, the sprockets 40 and chains 41 will also be given a continuous travel in definite timed relation to the speed of the fabric to be cut. Chain 80 is in operation and chain 81 idle, so that it may be replaced by a chain of different length without disturbing the rest of the machine. Switch 99 is now on contact 101. At each rotation of chain 80 lug 89 closes switch 92, actuating contactor 97 and sending an impulse through magnet 69. This withdraws slide 62 and couples one cutter carriage to the chains 41. This cutter moves with the chain until it reaches the upper end of cam 60, which disengages it from the chains and allows it to pile up with other surplus carriages at the vertical side of frame 11. The release of a carriage is completed at each revolution of chain 80, so that the length of this chain is a measure of the width of cut to be made. Due to the higher speed of chain 80 as compared to that of the speed of the fabric or the carriages, the length of a link on the chain corresponds to a comparatively small variance in cut, permitting the adjustment of the width of cut by adding or subtracting links from the chain.

If it is desired to change the width of cut being made it is possible by the means described to do it without stopping the rest of the machine or missing a cut. Having previously placed a chain 81 of the desired length around sprockets 79 and 83 all that needs to be done is to shift switch 99 from contact 101 to contact 100. This makes switches 91 and 94 active and discontinues switches 92 and 93 and can be done at any period in the rotation of the chain. Upon the next rotation of chain 80 switch 91 is actuated, which instantly starts the rotation of chain 81 by shifting the pinion 74. The latter chain when placed in the machine is located so that lug 89 is just in position to close switch 94. Therefore the closure of switch 94 will occur at substantially the same time as the closure of switch 91, and consequently at the same time as lug 89 passes the now inactive switch 92. The sequence of cuts is therefore uninterrupted, and the machine continues its operation as before except that it is under control of chain 81 instead of chain 80.

Having thus described my invention, I claim:

1. A bias cutter comprising fabric feeding devices, a cutter conveyor traveling across the fabric in timed relation to the speed of said feeding devices, a plurality of cutting elements and means for coupling said elements successively and in timed sequence to the conveyor.

2. A bias cutter comprising fabric feeding devices, a cutter conveyor traveling across the fabric in timed relation to the speed of said feeding devices, a plurality of cutting elements, timing device actuated in timed relation to said devices, and means controlled by the timing device for coupling said elements successively and in timed sequence to the conveyor.

3. A bias cutter comprising fabric feeding devices, a cutter conveyor traveling across the fabric in timed relation to the speed of said feeding devices, a plurality of cutting elements, means for coupling said elements successively and in timed sequence to the conveyor, and means for uncoupling said elements from the conveyor at a predetermined point in its path.

4. A bias cutter comprising a fabric supporting roll, an endless cutter conveyor traveling parallel to the axis of the roll for a portion of its course, a plurality of cutter carriages, cutters in said carriages positioned to bear against the roll surface, means for disconnecting said carriages from the conveyor, and means operable in timed relation to the roll and conveyor for coupling the carriages to the conveyor.

5. A bias cutter comprising fabric feeding devices, a cutter conveyor traveling continuously across the fabric in timed relation to the speed of said feeding devices, a plurality of cutters, and means for coupling said cutters intermittently to the conveyor for travel across the fabric.

6. A bias cutter comprising fabric feeding devices, a cutter conveyor traveling continuously across the fabric in timed relation to the speed of said devices, a plurality of cutter carriages normally connected to said conveyor, means for disconnecting the carriages from the conveyor at a predetermined point in its travel, an electrically operated device for coupling the carriages successively to the conveyor, and timing devices operable in timed relation to the devices and conveyor for transmitting electrical operating impulses to the coupling device.

7. A bias cutter comprising fabric feeding devices, a cutter conveyor traveling continuously across the fabric in timed relation to the speed of said devices, a plurality of cutter carriages, means for coupling the carriages successively to the conveyor, a plurality of timing devices, and means for selectively joining any of the timing devices to the coupling device for actuation thereof.

8. A bias cutter comprising fabric feeding devices, a cutter conveyor traveling continuously across the fabric in timed relation to the speed of said devices, a plurality of cutter carriages, means for coupling the carriages successively to the conveyor, a plurality of timing devices alternatively actuating the coupling device, means for selecting the timing device to be operative, and means operable by the selecting means for rendering all but the selected device ineffective.

9. A bias cutter comprising fabric feeding devices, a cutter conveyor traveling continuously across the fabric in timed relation to the speed of said devices, a plurality of cutter carriages normally coupled to the conveyor, means for disconnecting the carriages from the conveyor at a predetermined point in its path, means for recoupling the carriages successively to the conveyor, a plurality of chains operable in timed relation to the conveyor, and means associated selectively with any of the chains for operating the recoupling device.

MARTIN CASTRICUM.